United States Patent Office 2,841,783
Patented July 1, 1958

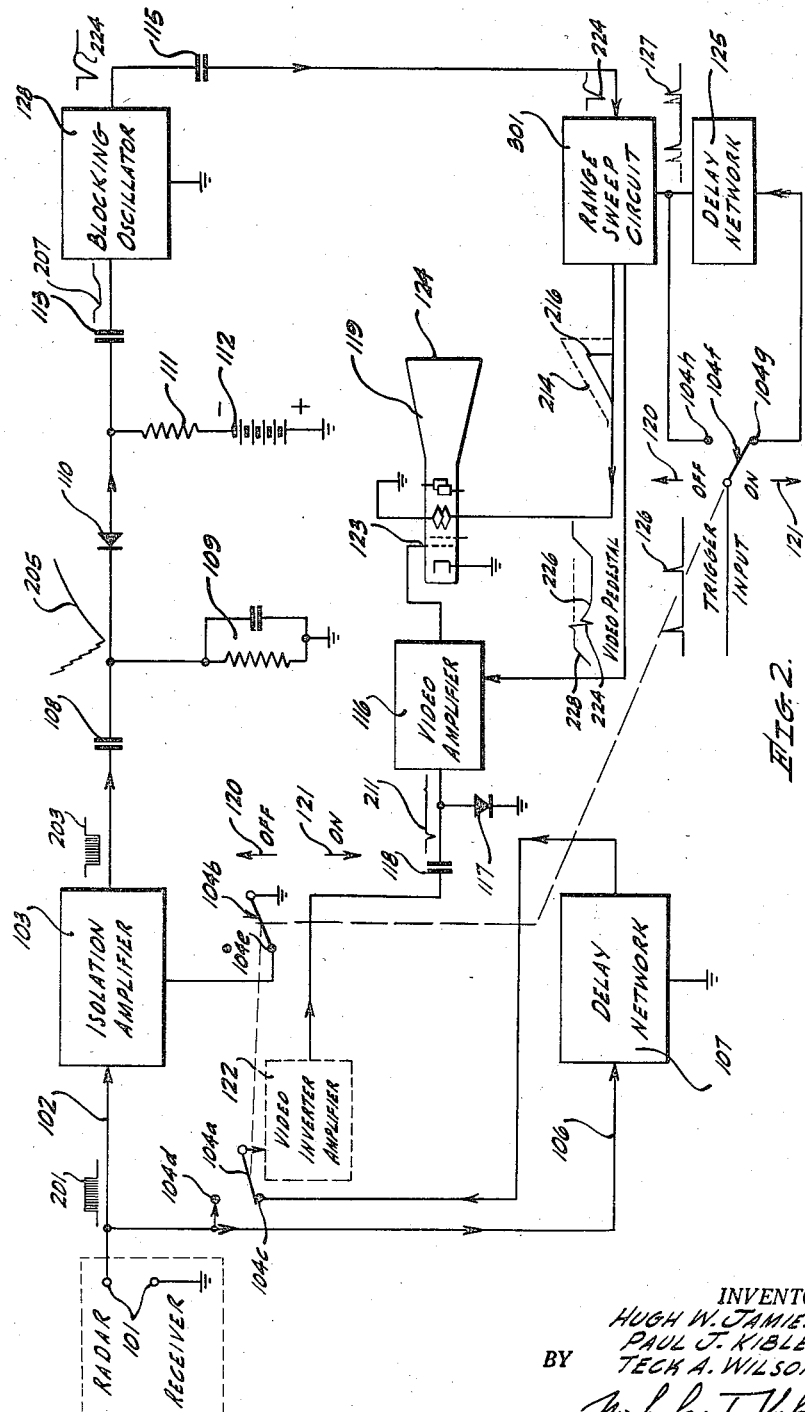

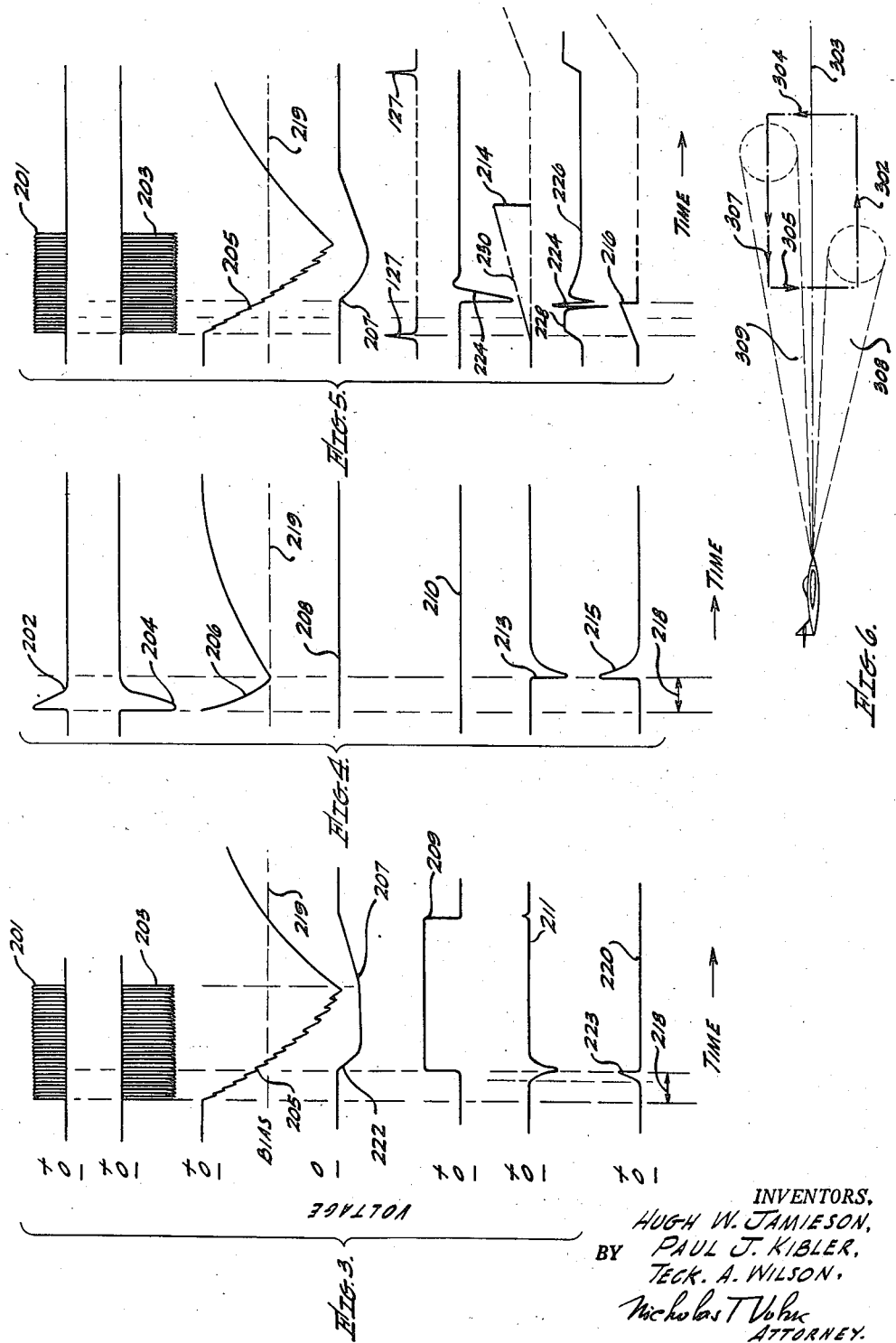

2,841,783

CLUTTER ELIMINATOR CIRCUIT

Hugh W. Jamieson, Woodland Hills, Paul J. Kibler, Los Angeles, and Teck A. Wilson, Playa Del Rey, Calif., assignors, by mesne assignments, to Hughes Aircraft Company, a corporation of Delaware Application June 17, 1953, Serial No. 362,210

9 Claims. (Cl. 343—17.1)

This invention relates to radar target echo indicating systems and, more particularly, to a circuit for eliminating undesired ground echo indications normally appearing in an airborne radar target echo system when portions of the ground are scanned.

In an airborne radar search system, a radar antenna is conventionally actuated to follow a predetermined scanning pattern. The antenna is moved by motors controlled by the radar system to scan a rectangular area ahead of the aircraft. A cycle of one type of scanning pattern, called a two-bar scan, encompasses a first horizontal scanning sweep from left to right. This is known as a lower bar scan. It is followed immediately by a second horizontal scanning sweep displaced vertically above the first scan and moving from right to left. The second scan is known as an upper bar scan. Hence, during the first sweep the beam radiated from the antenna scans and illuminates a predetermined lower portion of the horizon ahead of the aircraft, while, during the second sweep moving in the opposite direction, a predetermined upper portion of the horizon is illuminated. Visual indications of target echo signals or ground echo signals from both the lower and upper portions of the horizon are displayed in succession on the same surface area of the cathode ray tube screen.

Cathode ray tubes employed in radar systems have a normally long screen persistence compared to the duration of one scanning sweep in one direction. For this reason, images of echoes from an earlier sweep may still be visible on the cathode ray screen during a subsequent sweep while the brightened area of the screen still persists. The stronger the echo signals, the brighter the images on subsequent sweeps, and the longer they presist. As a result, the images of echo signals reflected from objects on the ground or from sea surfaces during a lower bar scan may persist long enough to be still visible during a proximately following upper bar scan and, hence, to obscure the indications of echos from targets in the area illuminated during the upper bar scan.

Airborne targets that are present and illuminated in the upper scanning area are smaller than ground surface areas. These targets usually reflect echo signals of lower intensity and shorter duration than ground echo signals occuring during a preceding lower bar scan. The video amplifier chain of the radar system does not normally discriminate between strong or weak, short or long echo signals received by the radar receiver. The stronger echo signals reflected from ground areas result in images which persist on the cathode ray tube screen for a period longer than the horizontal sweep interval. The persistent images may consequently obscure the images displayed on the screen resulting from subsequent weaker echo signals from airborne targets. Radar echo signals from the ground resulting in such strong indications on a cathode ray tube screen are sometimes called ground clutter, or may be referred to as clutter or clutter signals.

The present invention eliminates most of the effect of clutter resulting from ground echo signals on a radar cathode ray indicator. In accordance with the invention, clutter indications are eliminated by a circuit which effectively prevents the display of visual images on the cathode ray tube screen as long as clutter persists. In one embodiment a blocking signal is impressed on one part of the video channel to block the channel for the duration of the clutter signal only; a second embodiment eliminates the clutter and all longer range signals during cathode ray range deflection sweeps when clutter signals are present.

It is, therefore, an object of this invention to provide a circuit for substantially eliminating visible clutter indications due to ground echo from the screen of a cathode ray tube employed in a radar sysetem.

A further object of this invention is to provide a circuit which discriminates between desired target echo signals and undesirable clutter signals in a radar system to render the radar indicator unresponsive to the undesired signals and to permit desired signals to be visually indicated.

It is also an object of this invention to provide a circuit for substantially eliminating ground echo clutter from a radar indicator by blanking of the clutter video signals within the video amplifier of the radar system for the duration of the clutter echo signals.

Still another object of this invention is to provide a circuit for blocking the visual indication of undesired ground clutter on the screen of the cathode ray indicator tube of a radar system by eliminating all longer range signals on range sweeps where clutter is present.

The novel features which are believed to be characteristic of the invention, both as to its organization and method of operation, together with further objects and advantages thereof, will be better understood from the following description considered in connection with the accompanying drawings in which two embodiments of the invention are illustrated by way of example; and the scope of the invention is pointed out in the appended claims. In the drawings, Fig. 1 is a schematic block diagram of one embodiment of the clutter eliminator circuit of this invention applied to a video amplifier of a target echo indicating system;

Fig. 2 is a schematic block diagram of another embodiment of the clutter eliminator circuit of this invention applied to the range sweep circuit of a cathode ray tube of a target echo indicating system;

Fig. 3 illustrates the waveforms of voltages developed in various parts of the clutter eliminator circuit in the embodiment of this invention applied to the video amplifier of a radar indicating system when clutter signals are impressed on the circuit;

Fig. 4 illustrates the waveforms of voltages developed in various parts of the clutter eliminator circuit when a target echo signal is impressed on the circuit;

Fig. 5 illustrates the waveforms of voltages developed in various parts of the clutter eliminator circuit in the embodiment of this invention applied to a range sweep circuit when clutter signals are impressed on the circuit; and Fig. 6 is an illustration of the two-bar scanning pattern of the antenna of an airborne radar system during the search phase of its operation.

Figure 1:
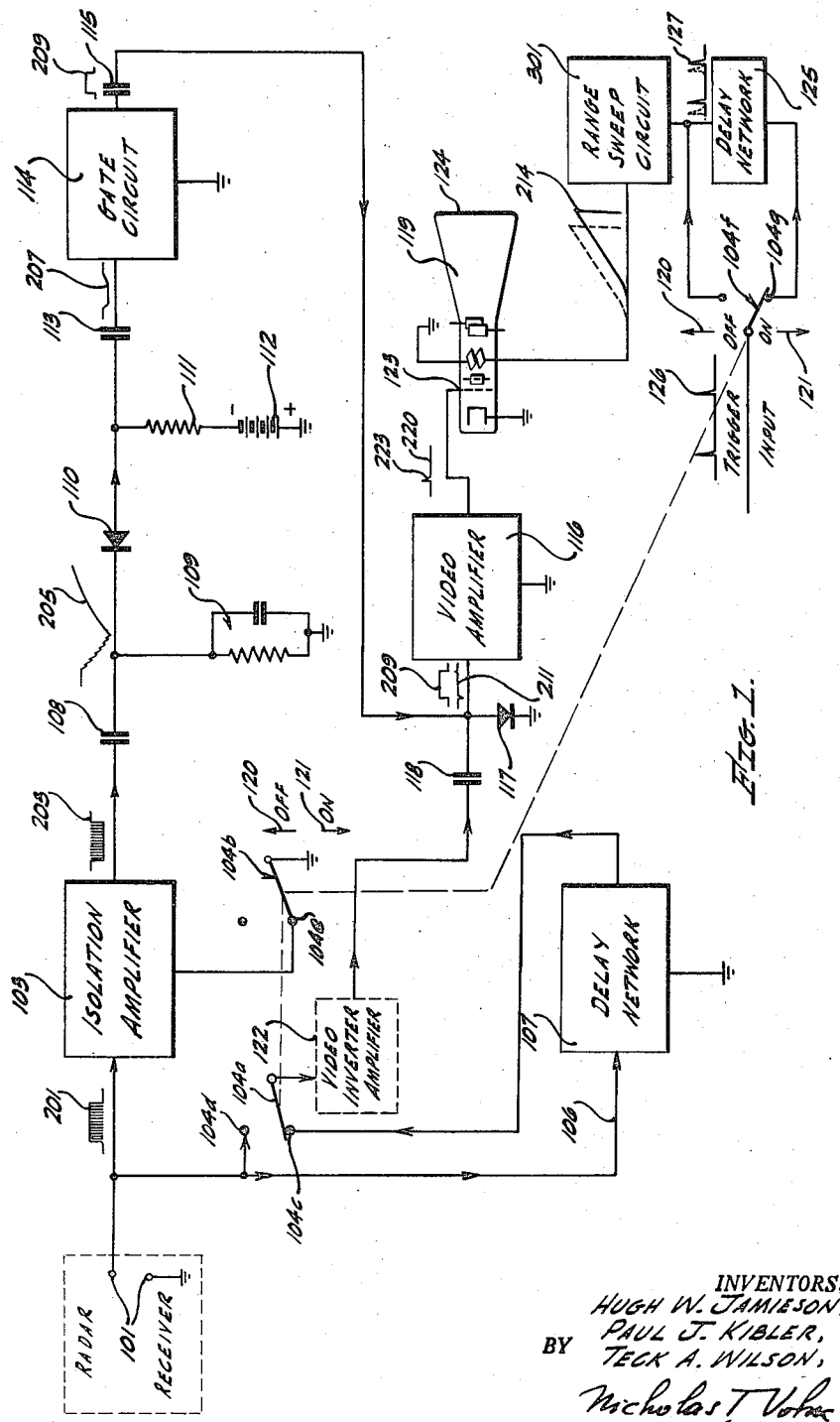

Referring to Fig. 1, input terminals 101 are for coupling the clutter eliminator and its associated circuits to the output of a radar receiver which impresses both target echo signals and clutter signals on these terminals. The signals are impressed simultaneously on an isolation amplifier 103 and a delay network 107. The input circuits of amplifier 103 and delay network 107 are connected in common to input terminals 101. The output circuit of delay network 107 is connected to a switch contact 104c of a switch 104a. The contact 104c is shown closed as in the operating or "on" condition of the clutter eliminator circuit. Isolation amplifier 103 is coupled through a capacitor 108 to one terminal of an integrating network 109 consisting of a resistor and a capacitor connected in parallel, grounded at one end, and also to the cathode of a rectifier 110. The ground return circuit of isolation amplifier 103 is connected to the closed switch contact 104e of a switch 104b. The anode of rectifier 110 is connected to a resistor 111 and to a coupling capacitor 113. Resistor 111 is connected to the negative terminal of a battery 112. The positive terminal of battery 112 is grounded. Coupling capacitor 113 is connected to a gate circuit 114. The output of gate circuit 114 is coupled to the grid circuit of a video amplifier 116 through a capacitor 115. A clamping diode 117 is connected between the grid circuit of amplifier 116 and ground. The contact arm of switch 104b is grounded. The contact arm of switch 104a is connected to the input circuit of video amplifier 122. The output circuit of delay network 107 is connected to closed contact 104c of switch 104a. The switches 104a and 104b are ganged together with switch 104f, to be described later. The output circuit of the video amplifier 116 is coupled to the electron beam control grid 123 of the cathode ray tube 119 of the radar system. A range sweep circuit 301 is coupled to the vertical deflection plates of cathode ray tube 119. A delay network 125 is connected between range sweep circuit 301 and the normally closed contact 104g of switch 104f.

A radar system incorporating the clutter eliminator circuit of this invention may be operated in at least two modes. These are the searching mode and the tracking mode. In the searching mode it is imperative that ground clutter be eliminated so that maximum visibility of the indicator screen 124 is possible. In the tracking mode of operation the antenna system of the radar is usually fixed on an airborne target in a particular direction where the likelihood of ground clutter is not great. The pilot of the aircraft may manually turn the clutter eliminator circuit "on" or "off" at will.

To more clearly describe the two-bar scanning function of the radar antenna system during the search mode of operation, reference is now made to Fig. 6. The arrow 302 on the lower bar of the scan pattern points in the direction of the left to right motion in the lower bar scan of the radar antenna. The dashed line 303 which bisects the scan pattern represents a horizontal plane straight ahead of the aircraft in the direction of flight. Thus, it can be seen that when the antenna is moved left to right through the lower bar scan direction 302 it is pointing downward 308 with respect to the direction 303 straight ahead of the aircraft. When the full lower bar scan 302 has been completed, the antenna is moved upward quickly, as shown by arrow 304, whence it begins the right to left scan as shown by arrow 307. When the antenna is moving through the upper bar scan as shown by arrow 307, it can be seen that the antenna will be pointing upward 309 with respect to the horizontal direction 303. At the termination of the upper bar scan the antenna is moved downward again, as shown by arrow 305, to the starting point to begin another scanning cycle.

During the lower bar scan 302, when ground areas are illuminated by the radar beam, clutter echo signals are received by the radar receiver. During the upper bar scan 307, target echo signals from objects in the air are received by the radar receiver.

Referring again to Fig. 1, switches 104a and 104b are provided on a common shaft so that the clutter eliminator circuit may be turned "on" when required, as in searching, and "off" when unnecessary, as in tracking.

In the "off" condition of the clutter eliminator circuit, the switches 104a, 104b, and 104f are in "off" position shown by the arrow 120 in Figs. 1 and 2. Target echo or clutter signals applied to the input terminal 101 are impressed on isolation amplifier 103 and on video inverter amplifier 122. In the "off" position of switches 104a and 104b the ground return circuit of isolation amplifier 103 is open because contact arm 104 is then connected to the unused contact 104e. As a result, amplifier 103 is inoperative. Delay and inverter network 107 is also disconnected at this time from video amplifier 122 as a result of the open condition of contact 104c of switch 104a in the "off" position. The above described circuit connections represent the condition of the radar when the clutter eliminator is "off," as in the tracking mode.

In the "on" position of switches 104a and 104b, shown by arrow 121, the clutter eliminator circuit of this invention is set into operation. Circuit connections are made to permit the ground return circuit of isolation amplifier 103 to be connected to ground through contact 104e and the contact arm of switch 104b. Also, through switch 104a, the output circuit of delay network 107 is coupled to the grid circuit of video amplifier 122 through contact 104c and the contact arm. The output of video inverter amplifier 122 is coupled to video amplifier 116 through capacitor 118. The switch 104f, also on the same actuating means with switches 104a and 104b, is employed to insert the range sweep delay network 125 between the source of master trigger pulses and the input of the range sweep circuit 301 which is described below in further detail.

In order to more clearly disclose the operation of the clutter eliminator circuit of this invention a series of waveforms is shown in Figs. 3, 4, and 5 representing the voltages which appear at various points in the circuit during the operation of the clutter eliminator.

Referring now to Figs. 3 and 4, considered together with Fig. 1, curves 201 and 202 represent signals which are impressed on the input terminals 101. Curve 201 is an idealized graph of a typical train of clutter signals, such as may be received in a lower bar scan as described in greater detail below. Curve 202 is a typical target echo video pulse which may be developed in the radar receiver from echo signals received from an airborne target, particularly during an upper bar scan. The signals represented by curves 201 and 202 are impressed on isolation amplifier 103 and simultaneously on delay network 107. The pulse train illustrated by curve 203 is developed at the output circuit of isolation amplifier 103 when clutter signal 201 is impressed on the amplifier 103. If a target echo signal 202 is impressed on isolation amplifier 103 during the operation of the clutter eliminator, pulse 204 is developed in the output of the amplifier. Curve 205 is the waveform of the voltage developed by integrating network 109 when pulse 203 is impressed on the network through capacitor 108. A negative bias voltage level with respect to ground is represented at 219. This is the level of the negative bias voltage applied to rectifier 110 through resistor 111 by battery 112. The curve 207 represents the waveform of the portion of the voltage developed by integrating network 109 when the voltage of curve 205 becomes more negative than the negative bias voltage shown at 219 impressed on rectifier 110 by battery 112. Voltage wave 207 is conducted through rectifier 110 and impressed on the input of gate circuit 114 through capacitor 113. Curve 208 represents the voltage at the output of rectifier 110 when the integrator network 109 has been charged by a pulse such as 206 where the negative voltage level of the pulse 206 does not become more negative than the bias voltage level as shown at 219.

The negative-going clutter pulse 211 is developed at the input of amplifier 116 after delay by delay network 107. The signal applied to network 107 is delayed a predetermined time interval as shown by arrows at 218 with respect to the start of the clutter pulse train 201.

A positive-going cancellation pulse 209 is generated by gate circuit 114 when pulse 207 is impressed thereon. It is delayed substantially the same time interval as shown at 218, as the delay of pulse 207. Pulse 209 is also applied to the grid circuit of video amplifier 116. It is to be noted that pulse 211 and pulse 209 are substantially coincident in their starting times and each is of opposite polarity to the other, resulting essentially in a zero signal at the grid of the video amplifier 116. Consequently, no output signal from the video amplifier 116 is impressed on the control grid 123 of cathode ray tube 119 beyond the small residual pulse 223, hereinafter explained.

Referring now to the column of waveforms in Fig. 4, a video pulse 202 is developed by the radar receiver from echo signals reflected from an airborne target and received at the receiver. The pulse 202 is applied to delay network 107 wherein it is delayed a time interval 218. The delayed pulse 213 is applied to the input circuit of video amplifier 116. A pulse 215 is developed in the output circuit of video amplifier 116 and is applied to cathode ray tube 119.

A second embodiment of this invention is shown in Fig. 2. The components of the circuit of the embodiment shown in Fig. 2, which perform the same functions as the identical components in the embodiment shown in Fig. 1, bear the same reference numerals. The circuit of Fig. 2 differs from that of Fig. 1 particularly in the following respects: a blocking oscillator 128 is provided in place of gate circuit 114. The input circuit of a blocking oscillator 128 is connected to capacitor 113 and the output circuit of the blocking oscillator 128 is coupled through capacitor 115 to a range sweep circuit 301. Range sweep circuit 301 has an input circuit which is coupled both to the output circuit of a delay network 125 and to a contact 104h of switch 104f. The input circuit of delay network 125 is connected to a terminal 104g of switch 104f. When the clutter eliminator circuit is "on," a trigger input signal 126 is applied through switch 104f, terminal 104g, and the delay network 125 to trigger the range sweep circuit 301. In the "off" position of switch 104f the trigger input signal 126 is applied directly to range sweep circuit 301 through switch terminals 104f and 104h.

Waveforms are illustrated in Fig. 5 which represent the operation of the embodiment of this invention shown in Fig. 2. Reference is now made to waveforms shown in Fig. 5. It can be seen that pulse waveforms 201, 203, 205, and 207 in Fig. 5 are identical with the identically referenced waveforms in Fig. 3. The resultant gate pulse 224 is the negative-going output pulse of blocking oscillator 128. The pulse 224 is applied to range sweep circuit 301.

Pulse waveform 214 represents a range sweep voltage wave generated by range sweep circuit 301 and applied in the absence of clutter signals to the vertical deflection plates of cathode ray tube 119. The dashed portion 230 of wave 214 is inserted to indicate that wave 214 has a period many times greater than pulses 201 or 203 and may be as much as 500 times as long. Pulse 216 is representative of the same range sweep voltage waveform stopped by the action of pulse 224 in the clutter eliminator circuit in the presence of clutter signals. At the point of "cut-off" the range sweep is returned to the quiescent condition as shown at 221. The quiescent condition continues until the range sweep voltage is initiated again with the next trigger pulse 127 to follow after the clutter signal.

In the embodiment shown in Fig. 2, with reference to the waveforms of Fig. 5, gate pulse 224, which is generated by the clutter eliminator circuits as a result of clutter signal 201, is the output pulse of the blocking oscillator 128. Pulse 224 (Fig. 5) is developed when pulse 207 is applied to blocking oscillator 128. Pulse 224 is applied to the range sweep generator, a part of the range sweep circuit 301, to terminate the generation of the range sweep voltage. The range sweep generator, in the absence of gate pulse 224, produces range sweep voltage 214. The application of pulse 224 to the range sweep generator of a circuit 301 results in the cutting off of the range sweep voltage as shown at 216. The range sweep voltage generator is rendered quiescent following the occurrence of clutter signals until the next trigger pulse 127 is applied. If the clutter signal producing object is still within range on the immediately subsequent range sweep, again the generation of the range sweep is terminated at that instant in the range sweep corresponding to the range of the clutter.

Waveform 228 is shown in Fig. 5 to represent a pedestal of voltage inserted in the video circuits of the radar by the range sweep circuitry to brighten the indicator screen 124 during the sweep. The brighter line thus produced on the cathode ray indicator screen is a means of indicating to the radar observer the instantaneous azimuth position of the radar antenna during the searching phase of radar operation. When clutter is present, and pulse 224 is applied to the range sweep circuits, this pedestal voltage is also terminated by the action of pulse 224. Thus, in addition to the cessation of deflection of the beam of the cathode ray indicator 119, the video circuit is affected to decrease the brightness of the screen for the duration of the sweep that has been cut off. There is accordingly, in this embodiment of the clutter eliminator, no indication of any kind on the indicator screen 124 for the remaining duration of any range sweep interval after the clutter has appeared.

The operation of the circuit of this invention when target echo signals are received in the absence of clutter signals is more fully understood with reference to Fig. 4. Signals referred to here are those received by the radar receiver during an upper bar scan, as shown at 307 in Fig. 6.

Referring now to the waveforms of Fig. 4, and also to Fig. 1, it can be seen that the positive-going short duration target echo pulse 202 (Fig. 4), impressed on the input terminals 101 from the radar receiver, is also impressed at the same time on isolation amplifier 103 and on the input of delay network 107. Isolation amplifier 103 need not necessarily amplify but may only isolate the input circuit 101 from the integrator network and reverse the signal polarity. At the output circuit of isolation amplifier 103, the negative pulse 204 is developed. The pulse 204 is impressed on integrator network 109 in which there is developed an output wave 206. Because of the relatively short duration of the pulse 204, the negative charge on network 109 does not reach a more negative value than the predetermined negative bias level shown at 219. This level 219 represents the bias voltage with respect to ground applied by battery 112 through resistor 111 to the anode terminal of rectifier 110. Thus, until the negative voltage at the cathode terminal of rectifier 10 becomes more negative than the negative bias voltage level 219, there is no conduction of the negative voltage through the rectifier 110 and, consequently, no voltage is applied through capacitor 113 on the grid of the gate circuit 114. The absence of voltage on the gate circuit 114 is represented by curve 208 and, accordingly, no output gate pulse is developed. This condition is represented by curve 210. Accordingly, the video pulse 213, now delayed a predetermined time interval by delay network 107, as shown at 218, is amplified and inverted by video amplifier 116. The inverted and amplified video pulse 215 is applied to the control grid 123 of cathode ray tube 119 to produce a brightening of the cathode ray tube screen 124 at a point in the screen surface corresponding to the azimuth position and range of the target.

During a lower bar scan 302 (Fig. 6), as hereinbefore described, echo signals reflected from the ground or the sea surface are received and processed by the receiver of the radar system to develop the positive-going clutter signal illustrated at 201 in Fig. 3, to which reference is now made. The clutter signal 201 is applied simultaneously to isolation amplifier 103 and to delay network 107. Amplifier 103 amplifies and inverts the clutter signal 201, producing the inverted clutter signal 203 which is impressed on integrating network 109. Integrating network 109 has a predetermined charging time. When pulses having the same time duration as the target echo signals 202 are impressed on the integrating network 109, the integrated negative output voltage does not become more negative than the bias voltage level shown at 219, as hereinbefore described. Clutter signals such as 203, however, have a longer duration. The integrating network 109 is charged by clutter signals 203, as shown by curve 205. At an instant of time, indicated at 222, when the negative charge across integrating network 109 becomes more negative than the fixed negative bias voltage level 219 applied to rectifier 110, the rectifier 110 commences to conduct as shown by curve 207. The conduction continues for the duration of pulse 207. Consequently, rectifier output signal 207 is impressed on the gate circuit 114 through capacitor 113. Gate circuit 114 as a result develops a positive-going gate pulse 209, which is impressed on the input circuit of video amplifier 116 through coupling capacitor 115. The duration of gate pulse 209 equals the duration of pulse 207.

During the period in which the gate pulse 209 is being developed, the clutter signal 201 is applied to delay network 107 and is delayed thereby. The resultant delayed clutter signal 211 is impressed on the input of inverter amplifier 122 and thereafter on video amplifier 116. Rectifier 117 at the inlet of video amplifier 16 is poled so that its anode terminal is coupled to the input of the amplifier 116 and the cathode terminal is grounded. In the absence of a cancellation voltage such as gate pulse 209 at the input of video amplifier 116, negative-going clutter signals such as 211 maintain the anode of rectifier 117 negative with respect to ground (cathode) and no conduction results. The clutter signal 211 is thereby applied to the video amplifier 116 without abatement. When, however, the positive gate pulse 209 is applied to the video amplifier 116 at substantially the same time as clutter signal 211, the positive pulse 209 cancels the negative clutter signal 211 at the input of the amplifier. Any excess of the voltage amplitude of the positive gate pulse 209 over the voltage amplitude of the negative clutter signal 211 would, in the absence of rectifier 117, remain on the input circuit of the video amplifier 116 making it positive by that excess. Rectifier 117, conducting whenever the anode connected to the input of video amplifier 116 becomes positive with respect to ground, dissipates the excess positive voltage to ground leaving the input of video amplifier 116 at a zero level. A resultant zero output signal, as shown at 220, is applied to the cathode ray tube 119.

The small residual pulse 223 which is observed in the output circuit of video amplifier 116 during the operation of the clutter eliminator circuit is believed to be due to a small difference in the time of occurrence of the leading edges of pulses 209 and 211 when the latter occurs first at the input of video amplifier 116. A small negative voltage is built up on the input of video amplifier 116 by the leading edge of clutter signal 211 before the arrival of pulse 209. This negative voltage can not be dissipated to ground through rectifier 117 and, hence, the amplifier 116 develops a positive output voltage pulse 223 until the leading edge of the positive-going gate pulse 209 is impressed on the input of amplifier 116. As viewed on the cathode ray tube screen, the visual result of the occurrence of pulses such as 223 is an outline of the ground area being scanned. For example, when flying over extensive sea areas in which there is an island within the area illuminated by the radar beam during the lower bar scan of the antenna, an outline of the island will be displayed on the cathode ray indicator screen 124. The outline is created by pulses such as 223 occurring each time the radar antenna scans and illuminates the island edge. However, as a result of the substantially coincident occurrence of pulses 209 and 211, video amplifier 116 will produce a substantially zero output level during the presence of all other clutter video signals impressed on input terminals 101. Hence, no signals are applied to the cathode ray tube 119 to vary the brightness of the screen image, and thereby no ground clutter images will be presented on the cathode ray tube screen other than the abovementioned outline image, or such other short pulse producing targets as appear at some other range further out in range beyond those causing clutter signals.

It can be seen from the above description that when echo signals corresponding to the undesired radar clutter signals are received by the target echo indicating circuits of a radar system equipped with the clutter eliminator circuit of this invention, the clutter signals having longer durations than target echo signals are prevented from being displayed on the cathode ray tube screen of the radar indicating system. A residual portion of the leading edge of a clutter signal train remains, as hereinbefore described, to provide an outline of ground areas scanned and illuminated by the radar antenna in the lower bar scan.

The clutter eliminator circuit is responsive only to clutter video signals to prevent their display on the cathode ray tube indicator 124 of the radar. The clutter signals are those of a predetermined time duration which produce signals of such an amplitude level that a predetermined bias in the circuit is overcome. The circuit is not responsive to target echo video signals which are shorter than the abovementioned predetermined duration. Images of the target echo signals are, therefore, displayed on cathode ray tube 124.

The target echo indicating system of the radar includes deflection circuits for controlling the electron beam of the cathode ray tube in a direction corresponding to the direction, in azimuth, toward which the radar antenna is pointing at that instant. Additional deflection circuits operating at a higher frequency produce saw tooth voltages which deflect the beam in the vertical direction so that the cathode ray tube screen may be calibrated to indicate range in the vertical direction. Such circuits and techniques are well known. The circuit employed here is the range sweep circuit 301. The range sweep circuit is triggered by the radar master pulse oscillator in the usual manner. Areas near the bottom of the screen indicate targets closest to the aircraft and areas near the top of the screen show targets farthest from the aircraft, in accordance with known Type B radar indicator presentation.

The second embodiment of this invention illustrated in Fig. 2, to which reference is now made, is considered together with the waveforms shown in Fig. 5. Blocking oscillator circuit 128 of the clutter eliminator circuit in this embodiment of the invention is coupled to the range sweep circuit 301 instead of to a video amplifier of the radar indicating system.

The waveform of one sweep cycle of the range sweep voltage is shown at 214 in Fig. 5. Upon the operation of switch 104f, when the clutter eliminator is activated, delay network 125 is inserted between the range sweep circuit and the source of master trigger pulses 126 in the radar system. The generation of each range sweep trace is delayed by the action of delay network 125 which for a time interval corresponding to the dalay imposed upon the signals applied to delay network 107 holds off application of the master trigger pulses 126 to the range sweep circuit. The time delay is illustrated at 127 (Fig. 2), where the original master trigger pulse 126 is shown in dashed lines and the delayed pulse 127 is in solid lines. The delay is necessary to eliminate a range error which would result were the delay not imposed on the start of the range sweep. The delay is also imposed on the range sweep circuit in the same way when, in the embodiment of this invention shown in Fig. 1, the clutter eliminator gate pulse 209 (Fig. 3) is applied to the video amplifier 116, as hereinbefore described.

When the clutter eliminator is in operation, as shown in Fig. 2 in conjunction with the waveforms of Fig. 5, the output circuit of blocking oscillator 128 is coupled to the range sweep circuit 301 in such a manner that a blocking oscillator output pulse 224 is developed when clutter is present and pulse 224 is applied to the range sweep generator which is part of and contained within the range sweep circuit 301.

When, in either embodiment, a target echo signal 202 is applied to the clutter eliminator circuit, gate pulse circuit 114, or blocking oscillator 128, is inoperative, as hereinbefore described, and no gate pulse such as 209 or 224 is generated, as shown by wave 210 in the waveforms of Fig. 4, and the target echo signal is displayed on the cathode ray screen 124.

Two embodiments of a clutter eliminator circuit have been described. One removes indications of radar clutter signals by cancelling the clutter signals at the input to a video amplifier stage of the radar indicating system. The second accomplishes this result by stopping the range sweep voltage and reducing the video level when clutter signals are present.

What is claimed is:

1. A clutter eliminator circuit comprising a source of video signals, wherein said signals include useful target echo signals and undesirable clutter signals; gating pulse generating means, coupled to said source, and responsive to said signals to develop a gating signal only in the presence of clutter signals from said source; a delay network, coupled to said source, and adapted to delay the signals from said source; and indicating means connected to said gating pulse generating means and said delay network, said indicating means adapted to be inoperative during the occurrence of a gating signal and to be operative in the absence of a gating signal, whereby only useful target echo signals are visually displayed by said indicating means.

2. A clutter eliminator circuit comprising: a source of video signals, wherein said signals include useful target echo signals and undesirable clutter signals; first means having an integrating network and a gate signal generator said first means being adapted to develop a delayed gate signal only in the presence of said clutter signals from said source, said first means coupled to said source; second means, also coupled to said source and adapted to delay the signals impressed thereon; a video amplifier coupled on its input side to said first means, said video amplifier being adapted to receive said delayed gate signal, said video amplifier also being coupled on its input side to said second means adapted to receive said delayed signals simultaneously with said delayed gate signal; and an indicating means coupled to said video amplifier, said indicating means being adapted to presenting visual images of said signals, whereby said gate signal blocks said delayed signals and thereby prevents the display of said clutter signals on said indicating means.

3. A clutter eliminator circuit comprising a source of video signals, wherein said signals include useful target echo signals and undersirable clutter signals; first means having an integrating network and blocking signal generator, said first means coupled to said source, said first means being adapted to develop a delayed blocking signal only in the presence of clutter signals from said source; second means, coupled to said source, and adapted to delay the signals from said source a predetermined time interval corresponding to the time delay of said blocking signal; and electron beam indicating means, having beam deflecting means, said indicating means connected to said second means and adapted to receive said delayed signals and to present visual images thereof, said beam deflecting means being connected to said first means and adapted to receive said delayed blocking signal, said beam deflecting means being adapted to be inoperative for the duration of delayed clutter signals, and said gating signal is impressed simultaneously on said beam deflecting means, thereby preventing clutter signals from being displayed by said indicating means.

4. A clutter eliminator circuit comprising a source of useful target echo signals and undesirable clutter signals; a first channel connected to said source; said first channel including an integrating network adapted to develop a voltage signal; a biased rectifier connected to said integrating network, adapted to produce a control pulse only in response to said clutter signals when the amplitude of said voltage signal exceeds a bias voltage impressed on said rectifier; a gating circuit, coupled on its input side to said rectifier, and adapted to receive said control pulse and to generate in its output a gating signal in response to said control pulse; a second channel connected to said source and including a delay network adapted to delay all signals impressed on said second channel from said source; and indicating means adapted to display visual images of said signals, said indicating means being connected to said delay network, and to the output side of said gating circuit, whereby the indicating means is blocked while said gating signal is impressed on said indicating means simultaneously with said delayed signals, thereby preventing said clutter signals from being visually displayed by said indicating means.

5. A clutter eliminator circuit comprising a source of useful target echo signals and undesirable clutter signals; a first channel connected to said source; said first channel including an integrating network adapted to develop a voltage signal; a biased rectifier connected to said integrating network, adapted to produce a control pulse only in response to said clutter signals when the amplitude of said voltage signal exceeds a bias voltage impressed on said rectifier; a blocking signal generating circuit, said circuit being coupled on its input side to said rectifier, and adapted to receive said control pulse and generate in its output circuit a blocking signal in response to said control pulse; a second channel connected to said source and including a delay network adapted to delay all signals impressed on said second channel from said source; and a cathode ray tube having means adapted to generate an electron beam, beam deflecting means and intensity control means, said delay network being connected to said intensity control means and adapted to intensity modulate said beam in response to said delayed signals, the output side of said blocking signal generating circuit being connected to said intensity control means and adapted to impress said blocking signal on said intensity control means simultaneously with said delayed signals and to block the delayed clutter signals impressed on said intensity control means, thereby preventing said clutter signals from modulating said beam.

6. A clutter eliminator circuit comprising a source of echo signals including useful target echo signals and undesirable clutter signals; a first channel connected to said source, said first channel including an integrating network adapted to develop a voltage signal, a biased rectifier connected to said integrating network, said rectifier adapted to produce a control pulse only in response to said clutter signals when the amplitude of said voltage signal exceed a bias voltage impressed on said rectifier, a blocking signal generating circuit, coupled on its input side to said rectifier, said blocking signal generating circuit being adapted to receive said control pulse and to generate in its output a blocking signal in response to said control pulse; a second channel connected to said source and including a delay network adapted to delay all signals impressed on said second channel from said source, a cathode ray tube having means adapted to generate an electron beam, beam deflecting means and an intensity modulating means, said delay network being connected to said intensity modulating means, said modulating means being adapted to modulate said beam in response to said delayed signals, said blocking signal generating circuit being connected on its output side to said beam deflecting means and adapted to impress thereon said gating signal simultaneously with said delayed signals being impressed on said intensity modulating means, whereby the said beam deflecting means is blocked while said gating signal is applied thereto, thereby preventing said clutter signals from being visually displayed on said cathode ray tube.

7. In a radar system including at least a receiving means and an indicating means, a clutter eliminator circuit for discriminating between useful target echo signals and undesirable clutter signals received by said receiving means, and for the prevention of visual display of the clutter signals on said indicator, said circuit comprising; an electrical integrating network coupled to said receiving means adapted to develop a voltage signal; a biased rectifier connected to said integrating network and adapted to produce a control pulse in response to said clutter signals when the amplitude of said voltage signal exceeds a bias voltage impressed on said rectifier; a blocking signal generator coupled to said biased rectifier adapted to receive said control pulse and to develop a blocking signal in response to said control pulse, said blocking signal generator being coupled in its output to said indicating means; and a delay network coupled between the receiving means and the indicating means said delay network being adapted to delay all signals impressed thereon, said blocking signal and said delayed signals being simultaneously applied to said indicating means whereby said blocking signal blocks said indicating means and prevents said indicating means from displaying images of said delayed signals.

8. In a radar system including at least a receiving means and an indicating means, a clutter eliminator circuit for discriminating between useful target echo signals and undesirable clutter signals received by said receiving means, and for the prevention of visual display of said clutter signals by the indicating means, said circuit comprising an electrical integrating network coupled to the receiving means adapted to develop a voltage signal; a biased rectifier connected to said integrating network and adapted to produce a control pulse in response to said clutter signals when the amplitude of said voltage signal exceeds a bias voltage impressed on said rectifier; a blocking signal generator coupled to said biased rectifier said signal generator being adapted to receive said control pulse and to develop a blocking signal in response to said control pulse; a delay network coupled to said receiving means; and a video amplifier coupled on its input side to said delay network and to said blocking signal generator, said video amplifier adapted to receive simultaneously on its input side said blocking signal and said delayed signals, said video amplifier being coupled on its output side to the indicating means, whereby when said blocking signal and said delayed signals are simultaneously impressed on said video amplifier the amplifier is blocked, thereby preventing application of said delayed signals to the indicating means.

9. In a radar system including at least a receiving means and an indicating means, a clutter eliminator circuit for discriminating between useful target echo signals and undesirable clutter signals received by said receiving means, and for the prevention of visual display of said clutter signals on the indicating means, said circuit comprising an electrical integrating network coupled to the receiving means and adapted to develop a voltage signal; a biased rectifier connected to said integrating network and adapted to produce a control pulse in response to said clutter signals when the amplitude of said voltage signal exceeds a bias voltage impressed on said rectifier; a blocking signal generator coupled on its input side to said biased rectifier, said generator being adapted to receive said control pulse and to develop a blocking signal in response to said control pulse, said blocking signal generator coupled on its output side to the indicating means and adapted to impress thereon said blocking signal; a delay network coupled to said receiving means; and a video amplifier coupled between said delay network and the indicating means, said video amplifier being adapted to receive said delayed signals simultaneously with said blocking signal applied to said indicating means, whereby when said blocking signal and said delayed signals occur simultaneously the indicating means is blocked preventing display of said delayed signals on the indicating means.

References Cited in the file of this patent

UNITED STATES PATENTS

| 2,388,200 | Wilmotte | Oct. 30, 1945 |
| 2,412,994 | Lehmann | Dec. 24, 1946 |
| 2,446,244 | Richmond | Aug. 3, 1948 |
| 2,523,283 | Dickson | Sept. 26, 1950 |
| 2,538,028 | Mozley | Jan. 16, 1951 |